United States Patent [19]

Villa

[11] Patent Number: 4,975,917
[45] Date of Patent: Dec. 4, 1990

[54] SOURCE OF COHERENT SHORT WAVELENGTH RADIATION

[75] Inventor: Francesco Villa, Alameda, Calif.

[73] Assignee: Harris Blake Corporation, Great Neck, N.Y.

[21] Appl. No.: 461,059

[22] Filed: Jan. 4, 1990

Related U.S. Application Data

[63] Continuation of Ser. No. 244,121, Sep. 14, 1988, Pat. No. 4,893,089.

[51] Int. Cl.$^5$ .............................................. H01S 3/30
[52] U.S. Cl. ........................................ 372/5; 372/87
[58] Field of Search ................ 372/5, 87; 378/119; 328/233

[56] References Cited

U.S. PATENT DOCUMENTS 4,598,415  7/1986  Luccio et al. ................... 378/119
4,893,089  1/1990  Villa ................................. 328/233

Primary Examiner—Leon Scott, Jr.
Attorney, Agent, or Firm—Ostrolenk, Faber, Gerb & Soffen

[57] ABSTRACT

An apparatus for producing coherent radiation ranging from X-rays to the far ultraviolet (i.e., 1 Kev to 10 eV) utilizing the Compton scattering effect. A photon beam from a laser is scattered on a high energy electron bunch from a pulse power linac. The short wavelength radiation produced by such scattering has sufficient intensity and spatial coherence for use in high resolution applications such as microscopy.

4 Claims, 5 Drawing Sheets

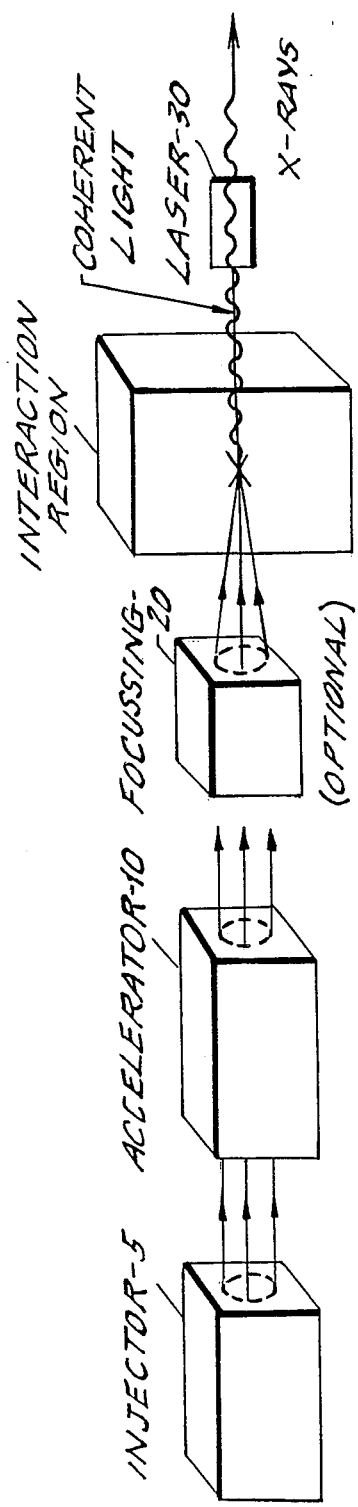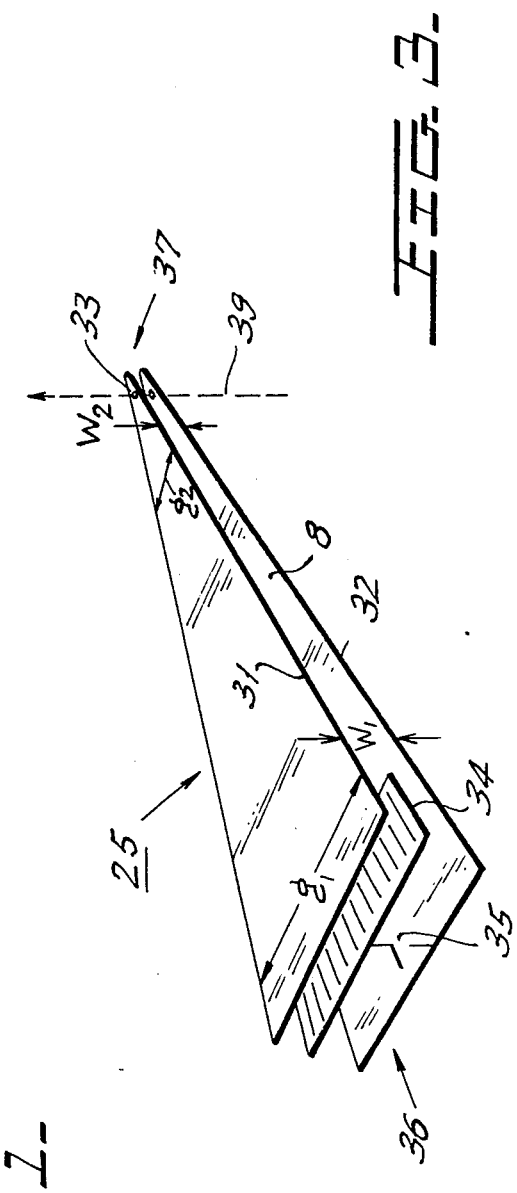

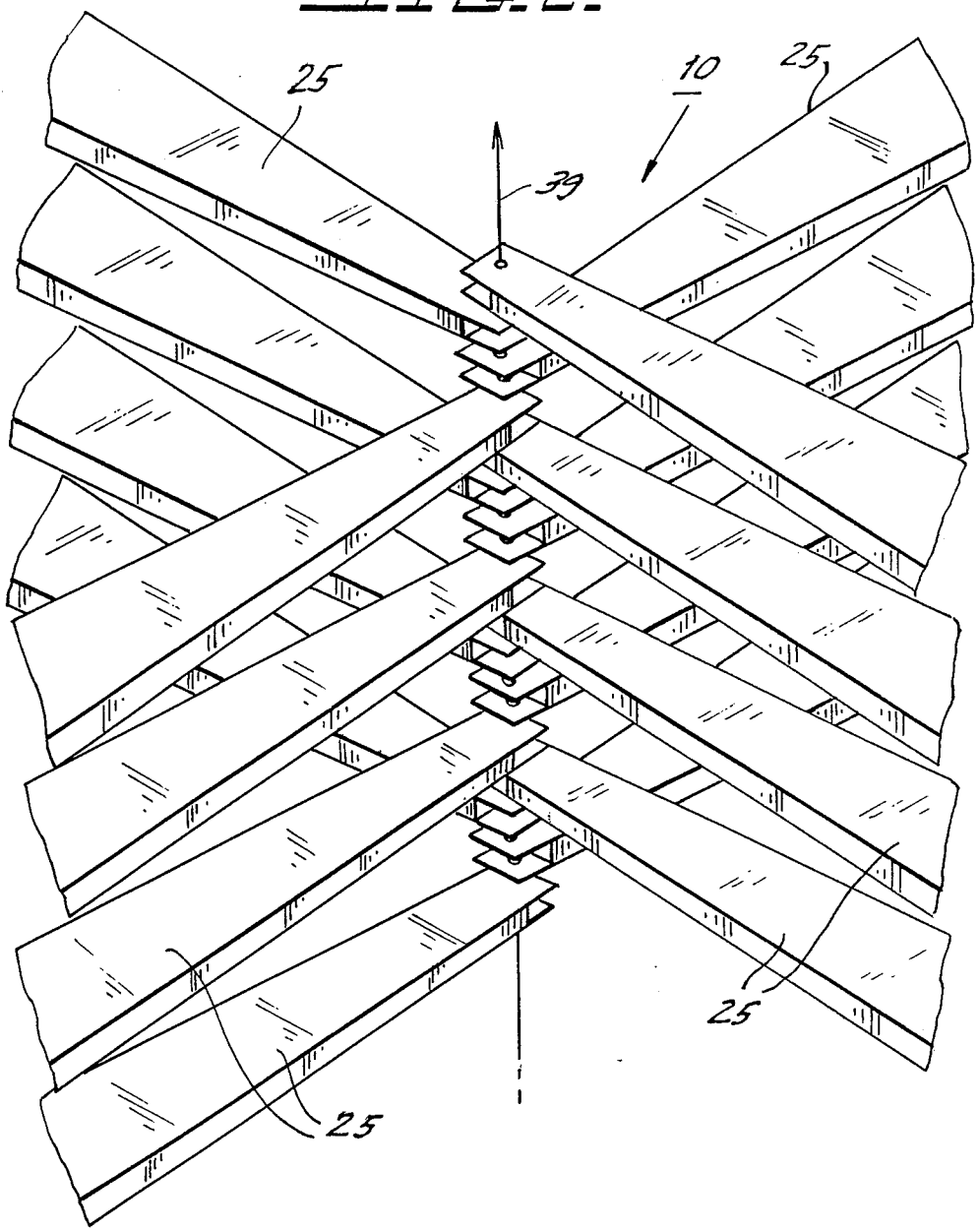

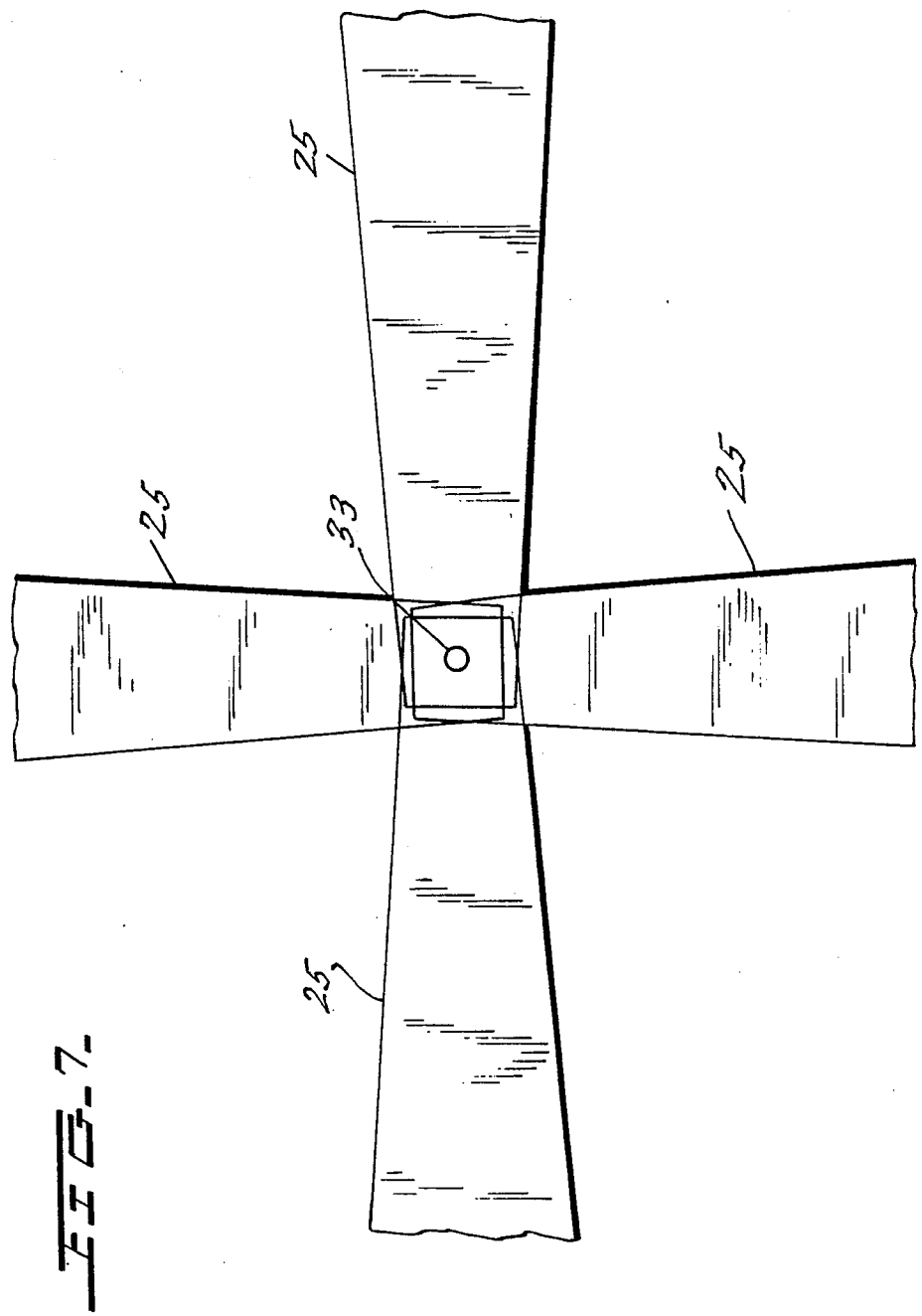

SOURCE OF COHERENT SHORT WAVELENGTH RADIATION

RELATED APPLICATIONS

This is a continuation-in-part of U.S. application Ser. No. 07/244,121, filed Sept. 14, 1988, now U.S. Pat. No. 4,893,089.

BACKGROUND OF THE INVENTION

1. Field of the invention:

The present invention relates to the production of coherent short wavelength radiation and, more particularly, to the production of coherent short wavelength radiation (e.g., X-rays and/or ultraviolet) utilizing the Compton scattering effect.

2. Description of the Related Art:

A coherent source of X-rays in the energy region of 500 to 1000 eV can be used as a first component of an X-ray microscope capable of very high resolution, to study biological materials in vivo, i.e., in their hydrated form.

This source is the equivalent of the light source in a conventional microscope. Many other applications of an X-ray generator, not necessarily in the field of life sciences, have been reported in the literature.

Quasi-coherent X-ray beams in the water window energy range are produced by storage rings; the synchrotron radiation from these machines is filtered by selecting small angular apertures of the radiation passed through a very small hole, and through a monochromator. As a consequence, the photon flux is reduced enormously (by some seven orders of magnitude or more). In practice, these sources have been used to make proof-of-principle holographic images of simple objects; scanning images and quasi-optical images have been shown as well. The intensity available from storage rings does not allow short exposure times; exposures very from several minutes to several hours (see Table 1 below adopted from M.R. Howells. "Soft X-Ray Imaging for the life Sciences", *Advanced Light Source Report*, (LSGN-008) LBL-27420)).

TABLE I

| Characteristics of Soft X-Ray Imaging Techniques | | | | |
|---|---|---|---|---|
| | CONTACT | IMAGING | SCANNING | HOLOGRAPHY |
| Resolution Achieved Angstroms | 200 | 500 | 500 | 630 |
| Dose (Mrads) (At resolution above) | 50 | 10–60 | 1 | 200 |
| Exposure Time Magnet | 5 min. | 10–100 sec. | 1 hr. | 1 day |
| Undulator | 5 sec. | | 2 min. | 1 hr. |
| Coherence needed? | No | No | Yes | Yes |
| Monochromaticity $\left(\frac{\lambda}{\Delta\lambda}\right)$ | 3 | 300 | 300 | 500 |
| Contrast | Amplitude | Amplitude | Amplitude | Amplitude and Phase |
| Phase Contrast | Not Possible | Possible | Possible | Occurs Naturally |
| Quantitative Microanalysis | Poor | Potentially doable (Diff. Absorption) | Differential Absorption Fluorescence | Poor |

Future high brightness storage rings, due to turn on in the next few years, may increase the available fluxes to values whose X-ray microscopy will fulfill the promise of high resolution. But as long as the source of X-ray is a storage ring, the technology of high-resolution imaging will not leave the national laboratory environment.

The importance of observing biological structures in a state, as close as possible to the natural state cannot be emphasized enough. Presently, high-resolution images of biological active, functioning structures are not available; in fact, most of the images are obtained by staining, modifying and denaturing the original materials, so that, in many cases, little resemblance remains to the original object.

Luccio et al., "Coherent Backscattering in the Soft X-Ray Region", BNL 38450 (June 1986) propose a method to generate monochromatic X-rays by scattering a photon beam on a bunch of electrons, whose density in the direction of motion is appropriately modulated (to be in resonance with the Doppler-shifted wavelength cf the incoming laser), a significant increase in the scattered radiation intensity can be obtained. Also, a degree of coherence is present in the scattered beam. The modulation of the bunch is obtained via the interaction of a magnetic field and the laser light itself, giving an energy modulation first This energy modulation is transformed in spatial modulation, as required, by transporting the modulated bunch for some distance.

While the above-described backscattering technique produces X-rays having a narrow bandwidth, the X-rays do not have sufficient spatial coherence, nor do they have sufficient intensity, to make "in vivo" imaging possible at the necessary resolution. Other methods known in the art for producing coherent X-rays, such as using storage rings to produce quasicoherent X-rays (discussed previously), result in extreme attenuation and thus require excessive exposure times for microscopy.

SUMMARY OF THE INVENTION

Accordingly, it is an object of the present invention to provide a source of coherent and short wavelength radiation with sufficient intensity and spatial coherence for imaging at high resolution.

Another object is to provide a relatively compact source of coherent short wavelength radiation which can be used in a laboratory type setting.

These and other objects are achieved by the present invention in which a photon beam from a laser is scattered on a high energy electron bunch from a compact pulse power linac to produce coherent short wavelength radiation ranging from X-rays to the far ultraviolet (i.e., from 1 Kev to 10 eV). Advantageously, in the present invention, there is no need to modulate the longitudinal density of the electron burch to be in resonance with the Doppler shifted wavelength of the incoming laser. Another advantageous aspect of the present invention is that the intensity of the backscattered beam of radiation increases by a factor of the order of the number of electrons acting coherently. Accordingly, the present invention provides, for the first time, a relatively compact source of coherent short wavelength radiation with sufficient intensity for microscopy.

The high energy electrons utilized for backward Compton scattering in the present invention are accelerated by a novel pulse power linac structure similar in principle to that described and claimed in U.S. application Ser. No. 07/244,121, filed Sept. 14, 1988, now U.S. Pat. No. 4,893,089. The linac basically consists of an array of radial directed waveguides that act as line transformers where high voltage pulses travel inward from the periphery and are ultimately applied to an electron beam extracted from a high field cathode. Such a structure produces very short intense pulses of high energy electrons in a very short fly path.

A short pulse of high energy electrons from the linac are directed essentially head-on at a beam of coherent, low energy photons, such as from a $CO_2$ laser, resulting in backscattering of the photons and the production of coherent short wavelength radiation in the required energy range for biological imaging.

BRIEF DESCRIPTION OF THE DRAWINGS

These and other features and advantages of the present invention will become apparent when the following text is read in conjunction with the accompanying drawings, in which:

FIG. 1 is a block diagram schematic of the present invention;

FIG. 2 is a schematic of the accelerating structure of the linac;

FIG. 3 is an enlarged view of one element of the accelerating structure of the linac;

FIG. 7 is a top view of the accelerating structure.

DETAILED DESCRIPTION OF THE PREFERRED EMBODIMENT

I. Structure and Operation of the Invention

Referring first to FIG. 1, the present invention has four primary components a particle generator or electron source 5, a linac 10, a magnet array 20 (optional) and a laser 30. Briefly, in the operation of the invention, electron source 5 generates electrons, which are accelerated by linac 10, concentrated by magnet array 20, and directed substantially head-on at coherent light from laser 30, resulting in backscattering of the laser light and the production of coherent X-rays.

The individual components of the invention will now be described in greater detail.

A. The Electron Source

Electron source 5 is a high field diode, preferably having a structure similar to one of the transformers that make up the accelerator described below. To produce electrons, the cathode of the diode (made of a metal with a high quantum efficiency in the ultraviolet, such as yttrium or samarium) is bombarded by UV laser light from a KrF laser or Nd:YAG quadrupled laser.

B. The Linear Accelerator

The design of the accelerator is similar in principle to the configuration disclosed in U.S application Ser. No. 07/244,121, filed Sept. 14, 1988, now U.S. Pat. No. 4,893,089, the disclosure of which is herein incorporated by reference. As in that prior application, linac 10 of the present invention comprises a plurality of accelerating gaps arranged in series. These gaps are energized in sequence by releasing or switching a single pulse of energy which propagates simultaneously along a plurality of transmission lines, each of which feeds an individual one of the gaps. The transmission lines are graduated in length so that the power pulse is present in each gap as the accelerator electron bunch passes therethrough.

The difference between the structure of the accelerator used in the present invention and that of the prior application is that, for a low-energy beam, the number of accelerating stages is small (less than 50) and therefore, one can avoid the twist of the lines, simply because the number of switches needed is manageable. In the previous embodiment, suitable for GeV energies, the lines were twisted to minimize or reduce the number of switches. Of course, the previous design could be used equally as well in the present invention.

Figure 6:
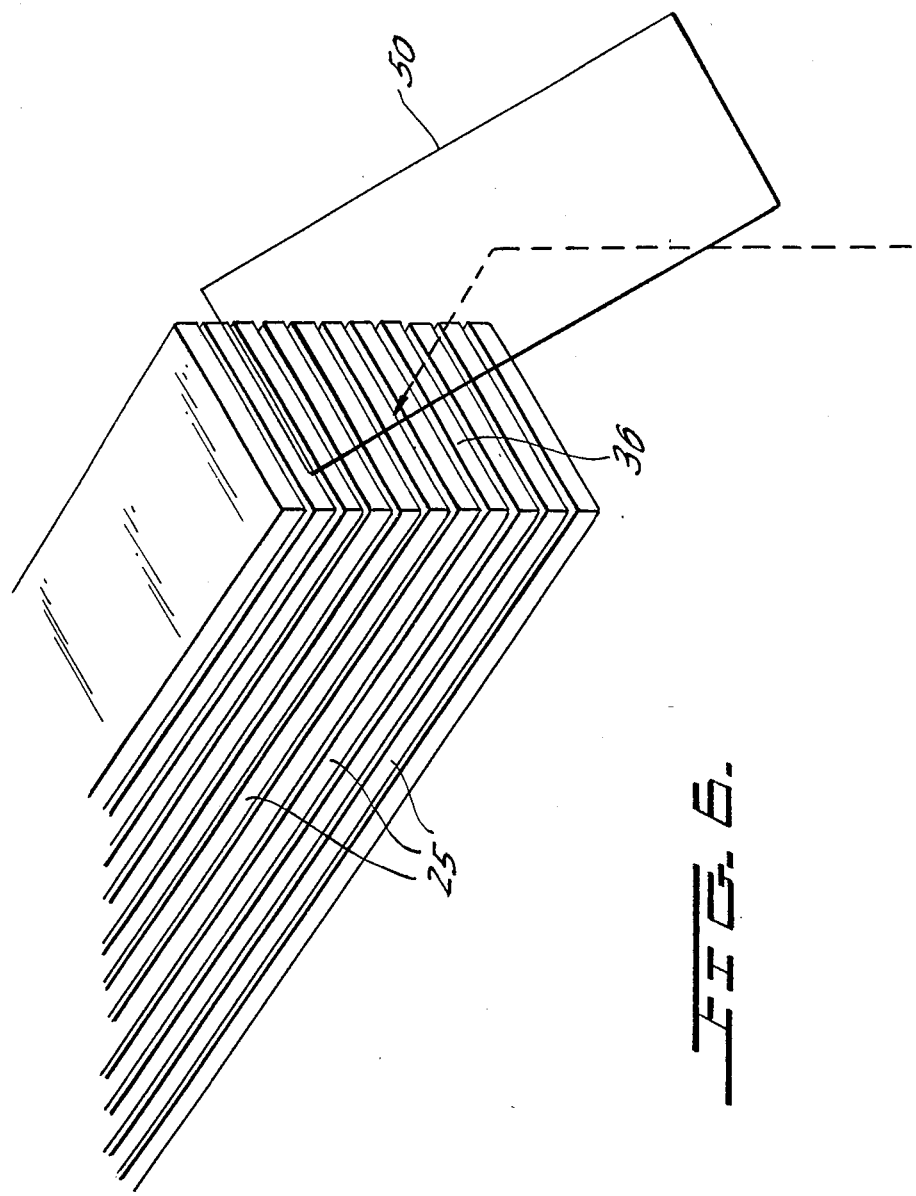
FIG. 6 is an enlarged side view showing a mirror used to send light to each switch of each element of the linac.

A schematic of the accelerating structure of multi-element linac 10 of the present invention is shown in FIG. 2. A top view of the structure is illustrated in FIG. 6, showing that the elements 25 of linac 10 are layered upon each other with 90° offset between adjacent elements. Although a 90° offset is preferred, any other even number of subdivisions, such as 180° (4), 45° (8), or 60° (6) would work.

Figure 4:
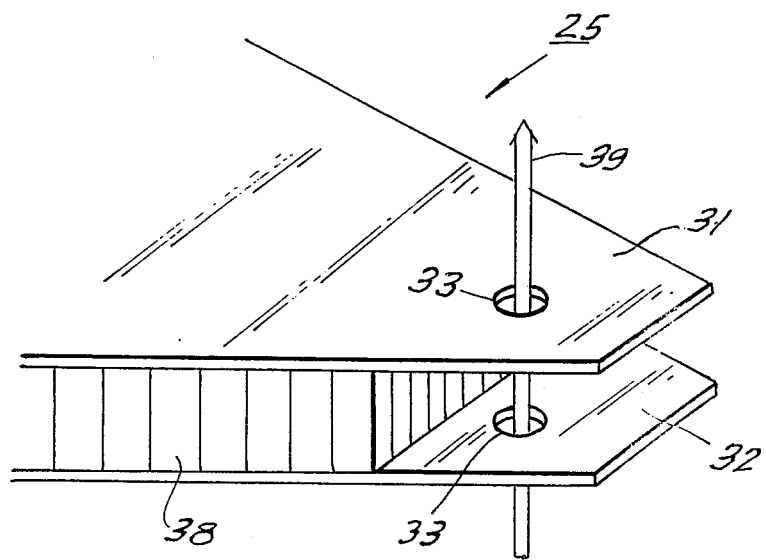
FIG. 4 is an enlarged tip end view of one element of the accelerating structure.

Referring now to the perspective view of FIG. 3 and the enlarged tip end view of FIG. 4, each element 25 of linac 10 includes a pair of spaced parallel tapered plates 31, 32. The tapered end of each of the plates 31, 32 includes an aperture 33 through which the generally straight line particle path 39 extends The means for injecting power into linac 30 is preferably provided by a charge storage plate 34 and a normally open switch 35 Storage plate 34 is disposed between transmission line plates 31, 32 at power input region 36.

Referring now to FIG. 6, a mirror 50 is used to send light sequentially to each switch 35 with appropriate timing so as to effectively provide an energy gradient that appears to travel along accelerating path 39 in on upward direction with respect to FIG. 2.

Dielectric material 38 fills the space between plates 31, 32 except at the central portions of having apertures 33 through which accelerating path 39 extends. The transit time for energy pulses is controlled by the dielectric constant of the material for insulator 38. Tapering of the space between plates 31 and 32, with spacing $g_1$ at injection region 36 being greater than spacing $g_2$ at accelerating region 37, controls the electric field at accelerating region 37. To further increase the electric field, each of the plates 31, 32 has a width $W_1$ at its pulse injection and larger than its width $W_2$ at the accelerating region 37.

Figure 5:
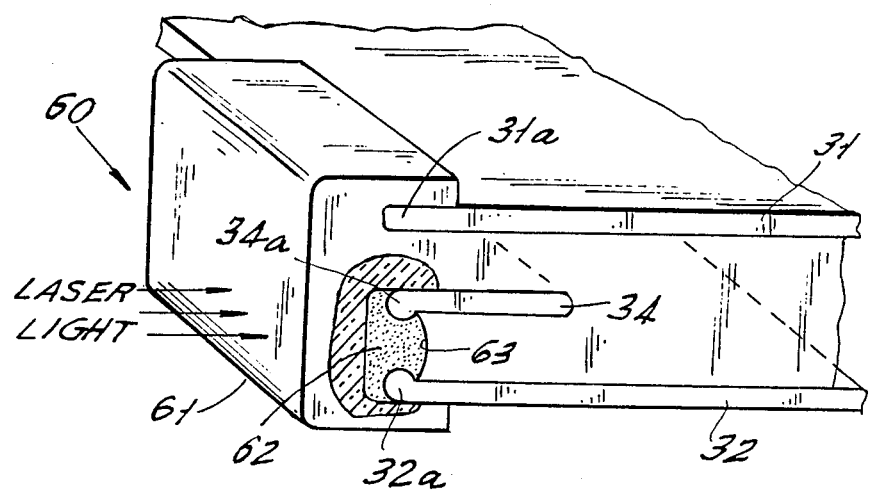
FIG. 5 is a schematic of a high speed switching device that is used for injecting pulse power into the linac.

FIG. 5 illustrates a switch 39 for producing the single pulse of energy into linac 10. Switch 39 is preferably a gas avalanche, laser triggered switch used for reliable ultrafast switching of relatively high currents at moderately high voltages. Such a switch is described in R.E. Cassel, F. Villa, "High Speed Switching in Gases," SLAC-PUB-4858 (Feb. 1989), herein incorporated by reference. Alternatively, other low energy switches, such as solid state (GaAs or silicon) or photoelectric switches may be used. An example of a suitable solid state switch is described in E.T. Lincke, *Proceedings of the Switched Power Workshop*, Brookhaven National Report, Oct. 16–21, 1988; J. Fisher et al., ibid, describes a suitable photoelectric switch The gas avalanche switch has an energy efficiency sufficiently high for use in a high energy collider, or in general, for machines whose final energy is of the order of 100 MV, or higher. For low energy machines, like that of the present invention, the solid state and photoelectric switches are both viable solutions.

The preferred gas avalanche switch 39 shown in FIG. 5 is the switching element in a Blumlein-type pulse forming network which includes shaped quartz element 41 that is transparent to UV light and is provided with cavity 43 that is filled with a gas 42 pressurized to about 30 atmospheres Cavity 43 extends for approximately the width of storage electrode 34, whose shaped edge portion 34a is disposed within cavity 43. Shaped edge portion 32a of transmission line plate 32 is disposed within cavity 43 while plate 31 does not extend into cavity 43. Edge portion 31a of plate 31 is disposed within slot 41a of quartz element 41. Portions of quartz element 40 are interposed between electrode 34 and plates 31, 32 and directly between plates 31, 32 in the region of electrode 34.

Initial ionization of gas 42 results from UV laser light (from the same laser driving electron source 5 to maintain proper synchronization) that is directed into cavity 43 and concentrated relatively close to anode electrode 34a of anode 34. This causes electrons to avalanche towards anode electrode 34a. The ionized region will spread away from the initial distribution because electrons produced by the avalanche will ionize the surrounding gas 42, and because the electrons are moving under the influence of the electric field. The displacement current of the electron avalanche will induce a pulse across plates or electrodes 31, 32.

The present machine will be fabricated on an appropriate high-frequency insulator having a high value of the dielectric constant one good candidate is sapphire, and it will be assumed that the dielectric constant of the dielectric is $\epsilon = 20$.

The analysis of this machine proceeds in a way similar to that of the previous one. Each section of the machine will be a parallel plate transmission line, having dimensions of $g_1$ and $w_1$ at the beginning, and $g_2$ and $w_2$ at the accelerating end. The impedance at the beginning of each line is:

$$Z_i = \frac{1}{\sqrt{\epsilon_r}} \frac{g_1}{g_1 + w_1}$$

and at the end $$Z_f = \frac{g_2}{g_2 + w_2}$$

The voltage gain $G_V$ is given by $$G_V = \sqrt[2]{\frac{Z_f}{Z_i}} = 2\epsilon_r \sqrt[4]{\frac{g_2}{g_1} \frac{g_1 + w_1}{g_2 + w_2}}$$

The factor of 2 is due to the fact that the lines are open, and therefore the reflected amplitude doubles at the expense of the magnetic field part of the electromagnetic wave.

For a gradient of $E = 3$ GV/m, the voltage required on each accelerating gap will be $g_2 E$. The electron bunch length is 30 microns, and the accelerating gap can be as small as 500 microns. The size of the gap is related to the diameter of the bunch, that fixes the minimum size of the iris through which the beam is accelerated. For 100 microns diameter bunch, an iris of 200 microns is sufficient, and the ratio of the gap to iris diameter is 2.5, which reduces the actual electric field by about 30%. Therefore, the voltage on the final accelerating stage should be 2 MV. With the following dimensions, $w_1 = 30$ mm, $g_1 = 3$ mm, $Z_i = 2.55$ ohms,
$w_2 = 1.2$ mm, $g_2 = 0.5$ mm, $Z_f = 110$ ohms,
the voltage gain is 13.2, and the injected voltage is 152 kV. It is assumed that the pulse duration is 10 ps FWHM, for total energy of 0.1 J/pulse, a modest 10 W at a repetition rate of 100 pps.

The energy gain/stage, neglecting beam loading will be the product of the effective gradient (3 GV/m) times the gap length, or 1.5 MeV. To obtain the energy of 50 MeV, 33 stages are required. To be conservative, the preferred embodiment includes 40 stages.

The total accelerating length will be 20 mm; if the thickness of the electrode is 250 microns, the total length of the machine will be 40 mm. Some of the relevant parameters are:

| | |
|---|---|
| number of stages | 40 |
| energy/pulse (one stage) | 0.1 J |
| energy/pulse (entire machine) | 4 J |
| power at 100 pps | 400 W |
| wall plug power (10% efficiency) | 4 kW |
| final energy (unloaded) | 50 MeV |
| energy in the beam (per pulse) ($10^8$ electrons) | $8 \times 10^{-4}$ J |
| total beam power | $8 \times 10^{-2}$ W |
| charging voltage | 150 kV |

As mentioned before, the lines do not have a twist in the electric field plane. This allows a very simple construction, since all the elements are identical. The problem of producing a trigger laser beam with 40 different focus lines (each switch to be triggered independently) is well within standard optics practice. The lines are grouped in four orthogonal sets (to reduce crosstalk among adjacent lines); the laser trigger is first split into four beams, and subsequently, each beam is focused onto four switches (see FIG. 2). The triggering laser beams may be staggered in time if the line's length is identical for all lines. Another option is to change the electrical length of the transmission lines, so that the electric field accelerating the electron bunch is appropriately synchronized.

C. The Magnet Array

Magnet array 20 is an array of permanent magnets which act to reduce the cross section of (and thereby concentrate) the electrons emitted from linac 10. Backscattering occurs at the focal point of the magnetic array, i.e. at the position where the electron beam is most concentrated. This array may or may not be necessary.

D. The laser

The photons which are backscattered are produced by a conventional laser 30, oriented so as to direct a collimated laser beam at the focal point of magnet array 20. The incoming photons are preferably supplied in short pulses. A short pulse (few picoseconds) $CO_2$ laser generating a few J/pulse is the preferred photon source, although other lasers, such as Nd:YAG or far infrared lasers could be used equally as well. The intensity of backscattered radiation increases with $\lambda i$ (initial wavelength) for constant laser energy.

II. Theory of Operation of the Invention

The theory of operation of the invention will now be explained.

Initially, it is necessary to clarify the meaning of the words coherence and coherent, because they are used to describe two different effects throughout the present disclosure. A photon beam generated by a laser has a high degree of coherence the act of lasing implies that the phase of each photon is constant. Therefore, a laser beam is coherent (and necessarily, also monochromatic). The scattering of a photon from an electron does not modify the phase of the photon, i.e., the scattered photon has the same phase of the incident photon As a consequence, a coherent laser beam scattered by an electron bunch will maintain the same degree of coherence, if all electrons have the same energy and are moving in the same direction These considerations describe the preservation of coherence in the Compton scattering process.

The term coherent is used also with a different meaning, explained as follows The intensity of the radiation obtained by scattering a laser beam from an electron bunch is given by $$N_\gamma = 2\ n_e n_{65}\ \sigma / A, \qquad (1)$$

where $N_\gamma$ is the number of scattered photons, $n_e$ is the number of incident electrons, $\sigma$ is the cross section $(0.665 \times 10^{-28}\ m^2)$. A is the area common to both beams, and $n_{65}$ is the number of initial photons.

Eq (1) above implies that each electron is seen by the incoming laser beam as an isolated charge. The energy of the scattered photon is increased to (for head-on scattering):

$$E_f \approx E_i \cdot 4\gamma^2, \qquad (2)$$

where the initial photon energy is $E_i$ and the final photon energy is $E_f$. $\gamma$ is the usual ratio between the energy of the electron and its rest mass m.

For 90° scattering:

$$E_f = E_i \cdot 2\Gamma^2, \qquad (2a)$$

A 50 MeV electron has a $\gamma$ of 97.85

Thus, the energy of the laser photon is increased by 38,300 times for 180° scattering; by 19150 times for 90° scattering A $Co_2$ (10 microns wavelength) photon has about 0.1 eV energy. So a 50 MeV electron will convert a photon to 3.8 Kev; therefore, 50 MeV is probably the highest energy one needs. To upshift at 180° $CO_2$ light to 1 Kev, one needs only about 26 MeV.

In conclusion, a dense electron bunch will scatter a photon beam coherently (if sufficiently dense), increasing the intensity of the scattered beam by several orders of magnitude The scattered beam will be coherent also, and the degrees of coherence will be dictated mainly by the electron bunch quality if the original laser beam is appropriately made as coherent as possible.

A. Generation of the electron bunch

The key element in the X-ray source is the high-density electron bunch As stated previously, the energy required to upshift carbon dioxide laser light in the X-ray region (from Eq. (2a)) is of the order of 25 MeV, quite easily achieved by conventional accelerators. But the requirement of high density can be achieved only if extremely high electric fields are used to extract the bunch from a diode's metallic cathode. It can be shown that the maximum charge extracted from a cathode surface is given by (this is a simple consequence of Gauss's law):

$$n_e q = \epsilon_0 E a, \qquad (3)$$

where:
$n_e$ = number of electrons;
q = electron charge;
E = electric field;
A = area of the emitting surface;
$\epsilon_0 = 8.85 \times 10^{-12}$ for MKS units.

The above equation is valid when the bunch length is much smaller than the diode's anode-to-cathode gap. If the maximum charge is extracted, the energy distribution of the electrons becomes broad, since the electric field seen by the trailing electrons is very close to zero. The energy distribution can be calculated only by very complex computer codes, but it is a good (conservative) approximation to assume that if a fraction c of the maximum available charge is extracted, the width of the energy distribution will be $\alpha$: a 1% of the total charge will have an energy spread of 1%.

B. Energy loss and compensation

Energy conservation requires that the increase in energy of the photon occur at the expense of the electron kinetic energy. For a coherent scattered intensity, the electron bunch energy will change by an amount larger than the energy spread. This effect can be removed simply by returning the energy lost by the electrons with an appropriate quasi-static electric field. This field is applied to the interaction region, and the exact value can be tuned by maximizing the X-ray intensity.

What is claimed is:

1. A source of coherent short wavelength radiation, comprising:
   (a) means for emitting charged particles that travel in one direction along a linear path;
   (b) a high gradient linear accelerator for accelerating said charged particles travelling in said one direction along said linear path to produce dense bunches of said charged particles as said charged particles travel through said linear accelerator in a single pass, said linear accelerator comprising a plurality of electrode gaps disposed in series, each of said electrode gaps being defined by a pair of spaced electrodes disposed transverse to said path, each of said electrodes having an aperture through which said linear path extends, said electrodes each being coupled to a source of energy pulses by a respective transmission line, the transmission lines for each pair of spaced electrodes being open circuited at their ends with respect to one another, said charged particles being subjected to an accelerating force generated by an electric field which is derived from each of said energy pulses as said charged particles pass through said electrode gaps; and (c) a source of coherent light for producing a photon beam along a direction substantially opposite to said one direction and into colliding relationship with said focussed accelerated charged particles;

such that, as a result of Compton backward scattering, coherent short wavelength radiation is produced in a direction substantially the same as said one direction.

2. A source of coherent short wavelength radiation as recited in claim 1, wherein said transmission lines have a tapered, untwisted configuration.

3. A source of coherent short wavelength radiation as recited in claim 1, further comprising means for focusing said accelerated charged particles traveling in said one direction from said linear accelerator to reduce the cross section thereof.

4. A method for producing coherent short wavelength radiation, comprising the steps of:

(a) producing charged particles travelling in one direction along a linear path;

(b) accelerating said charged particles travelling in said one direction along a linear path by sending said charged particles through a high gradient linear accelerator in a single pass to produce dense bunches of said charged particles, said linear accelerator comprising a plurality of electrode gaps disposed in series, each of said electrode gaps being defined by a pair of spaced electrodes transverse to said path, each of said electrodes having an aperture through which said linear path extends, said electrodes each being coupled to a source of energy pulses by a respective transmission line, the transmission lines for each pair of spaced electrodes being open circuited at their ends with respect to one another, said charged particles being subjected to an accelerating force generated by an electric field which is derived from each of said energy pulses as said charged particles pass through said electrode gaps; and (c) providing a photon beam of coherent light along a direction substantially opposite to said one direction and into colliding relationship with said charged particles, such that, as a result of Compton backward scattering, coherent short wavelength radiation is produced in a direction substantially the same as said one direction.

* * * * *

UNITED STATES PATENT AND TRADEMARK OFFICE
CERTIFICATE OF CORRECTION

PATENT NO. : 4,975,917

DATED : December 4, 1990

INVENTOR(S) : Villa

It is certified that error appears in the above-identified patent and that said Letters Patent is hereby corrected as shown below:

Column 1, line 9, immediately before the heading "BACKGROUND OF THE INVENTION", insert the following paragraph:

--The Government has rights in this invention pursuant to Contract No. DE-AC03-76SF00515 - MODIFICATION NO. M162 awarded by the U.S. Department of Energy--.

Signed and Sealed this

Fourth Day of August, 1992

Attest:

DOUGLAS B. COMER

*Attesting Officer*  *Acting Commissioner of Patents and Trademarks*